United States Patent
Hoehn et al.

[15] 3,669,950

[45] June 13, 1972

[54] DIPYRAZOLO[3,4-B:3,4D]-PYRIDIN-3-ONES

[72] Inventors: Hans Hoehn, Tegernheim; Ernest Schulze, Regensburg, both of Germany

[73] Assignee: E. R. Squibb & Sons, Inc., New York, N.Y.

[22] Filed: Dec. 1, 1970

[21] Appl. No.: 94,179

[52] U.S. Cl. ...............260/295.5 T, 260/295.5 B, 424/266
[51] Int. Cl. ...........................................C07d 31/44
[58] Field of Search................................260/295 T, 295.5 T

[56] References Cited

OTHER PUBLICATIONS

Brack, Chem. Abstracts, Vol. 62, P. 11,799 (May 1965)

*Primary Examiner*—Alan L. Rotman
*Attorney*—Lawrence S. Levinson, Donald J. Perella, Burton Rodney and Merle J. Smith

[57] ABSTRACT

New dipyrazolo[3,4—b:3',4'-d]pyridin-3-ones and their salts are useful as central nervous system depressants. This type of compound also increases the intracellular concentration of adenosine-3',5'-cyclic monophosphate.

12 Claims, No Drawings

DIPYRAZOLO[3,4-B:3,4D]-PYRIDIN-3-ONES

SUMMARY OF THE INVENTION

This invention relates to new dipyrazolo[3,4—b:3,4—d]-pyridin-3-ones and their salts. These new compounds have the structural formula

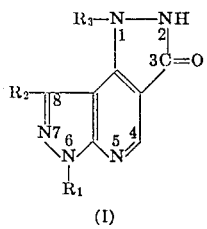 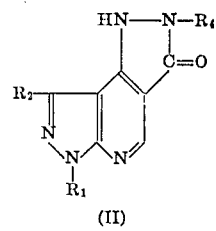

(I)   (II)

In formulas I and II $R_1$ represents lower alkyl, cyclo-lower alkyl, phenyl or phenyl-lower alkyl and simply substituted members of the latter two; $R_2$ represents hydrogen or lower alkyl. $R_3$ in formula I represents hydrogen, lower alkyl or hydroxy-lower alkyl. $R_4$ in formula II represents phenyl or simply substituted phenyl.

Preferred compounds of formulas I and II are those in which $R_1$ is ethyl or benzyl, especially the first; $R_2$ is lower alkyl, especially methyl; $R_3$ is hydrogen or lower alkyl, especially methyl; and $R_4$ is phenyl.

DETAILED DESCRIPTION OF THE INVENTION

The lower alkyl groups represented by $R_1$ and $R_2$ include straight and branched chain aliphatic hydrocarbon groups of up to seven carbon atoms such as methyl, ethyl, propyl, isopropyl, butyl, t-butyl and the like. The phenyl-lower alkyl groups represented by $R_1$ are radicals in which a phenyl group is attached to a hydrocarbon chain like those above, for example, benzyl, phenethyl and the like. The hydroxy-lower alkyl groups represented by $R_3$ comprise lower alkyl groups of the type described with a terminal hydroxy group, e.g., hydroxymethyl, hydroxyethyl (which is preferred) and the like.

The phenyl and phenyl-lower alkyl groups represented by the symbols may be simply substituted with one or two substituents on the aromatic ring. Thus they may be represented as $(R_5)_n$-phenyl or $(R_5)_n$-phenyl-lower alkyl, wherein $R_5$ is hydrogen, lower alkyl, halogen, or lower alkoxy and $n$ is 1 or 2. The lower alkyl groups are the same as already described. The lower alkoxy groups are of the same kind, e.g., methoxy, ethoxy, propoxy, isopropoxy and the like. All four halogens are contemplated, but chlorine and bromine are preferred.

The cyclo-lower alkyl groups represented by $R_1$ are the three- to six-membered cycloaliphatic groups cyclopropyl, cyclobutyl, cyclopentyl and cyclohexyl (of which the last two are preferred, especially cyclohexyl).

The new compounds are formed by the following series of reactions. The symbols in the structural formulas have the same meanings as previously described.

A 5-aminopyrazole of the formula (III) 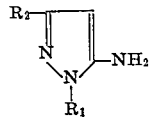

is produced as described in British Pat. No. 1,057,740, published Feb. 8, 1967, by ring closure of an aldehyde or ketone hydrazone of the formula (IV) 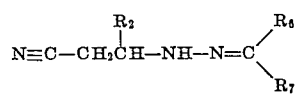

wherein $R_2$ is the same as previously defined and $R_6$ and $R_7$ each is hydrogen, lower alkyl, phenyl, phenyl-lower alkyl or together complete a cycloalkyl ring. The cyclization is effected by heating at a temperature of about 90° to 130°C. in an inert liquid solvent, e.g., an alcohol like ethanol, butanol or the like, preferably in the presence of a catalyst, e.g., alcoholates like alkali metal alcoholates particularly butylates such as sodium butylate.

This 5-aminopyrazole is reacted with an alkoxymethylene malonic acid ester of the formula (V) 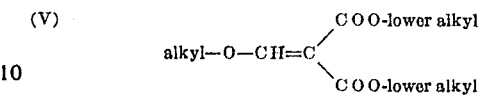

This may be effected by heating the reactants at a temperature of the order of 120°C. for several hours, and results in a compound of the formula (VI) 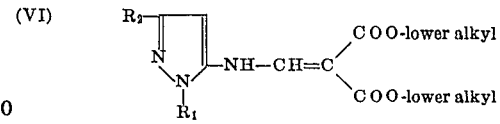

The alkoxymethylene malonic acid esters of formula V are known compounds and are produced like ethoxymethylene malonic acid diethyl ester [Organic Syntheses 28, 60–62 (1948)]Cyclization of a compound of formula VI produces a product of the formula (VII) 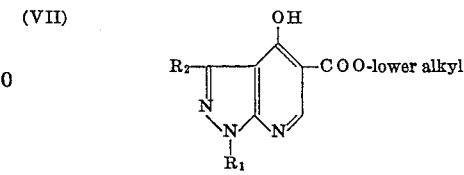

wherein $R_1$ and $R_2$ correspond respectively to $R_1$ and $R_2$ of the starting material. This reaction is carried out by heating the pyrazolyl-aminomethylene malonic acid ester of formula VI in an inert organic solvent such as diphenyl ether at a temperature of about 230° to 260°C. for several hours while removing, e.g., by distillation, the alcohol (lower alkyl-OH). The product is then separated from the solvent, e.g., by fractional distillation.

Treatment of a compound of formula VII with an alkylating agent such as an alkyl iodide like ethyl iodide converts the hydroxy group to an alkoxy group and this product may also be used in the next step of the process.

Reaction of a compound of formula VII (or the alkyl ether referred to in the preceding paragraph) with at least an equivalent amount of hydrazine, substituted hydrazine or a salt thereof, e.g., hydrazine hydrate, hydrazine hydrochloride, methylhydrazine, ethylhydrazine, hydroxyethylhydrazine, phenylhydrazine, p-chlorophenylhydrazine, 3,4-dibromophenylhydrazine or the like, yields a compound of one of the following formulas (VIII) 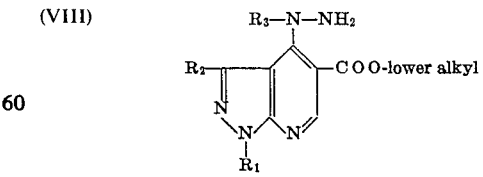

(IX) 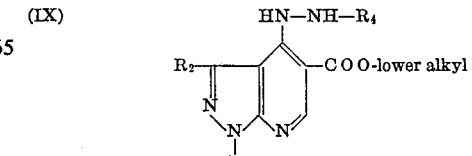

If hydrazine or hydrazine containing an aliphatic substituent, i.e., $R_3$—NH—NH$_2$, wherein $R_3$ has the meaning defined above is used as the reactant, then the product of formula VIII is formed. However, if an aromatic substituted hydrazine, i.e., $R_4$—NH—NH$_2$, wherein $R_4$ has the meaning defined above, is the reactant, then the product of formula IX is formed. This determines whether the end product of formula I or formula II is obtained in the next step of the process.

The reaction of the hydrazine with the compound of formula VII is effected by dissolving the latter in an inert, preferably dry, organic solvent e.g., an alcohol, like absolute ethanol, and adding the hydrazine, preferably with a small amount of metal like zinc chloride. The mixture is heated, e.g., at reflux temperature, for several hours, then the product is isolated.

Alternatively, the compound of formula VII may first be converted to its chloro analog(i.e., the hydroxy group is replaced by chlorine) by treatment with phosphorous oxychloride or the like. The chloro compound is then treated with the hydrazine in the same manner as described above.

The hydrazine of formula VIII or formula IX is then converted to the product of formula I or formula II, respectively. The cyclization is effected by heating at a temperature of about 20° to 100°C., with or without an inert liquid solvent (e.g., an alcohol like ethanol or butanol), preferably in the presence of a catalyst, e.g., an organic or mineral acid like acetic acid or hydrochloric acid or a metal alcoholate or metal hydroxide like sodium ethylate or sodium hydroxide.

Alternatively, a compound of formula I wherein $R_3$ is lower alkyl may be obtained by alkylating a compound of that formula wherein $R_3$ is hydrogen, e.g., with an alkyl sulfate like dimethylsulfate.

It will be appreciated that the compounds of either formula I or formula II, by means of a 1,3- or 1,5-shift of the hydrogen on the 1- or 2-nitrogen respectively, can exist in the hydroxy form and these tautomeric forms are also within the scope of this invention, the keto form being used throughout as a matter of convenience.

The compounds of formula I form salts which are also part of the invention. The salts include acid-addition salts, particularly the non-toxic, physiologically acceptable members. The bases of formula I form salts by reaction with a variety of inorganic and organic acids providing acid addition salts including, for example, hydrohalides (especially hydrochloride and hydrobromide), sulfate, nitrate, borate, phosphate, oxalate, tartrate, malate, citrate, acetate, ascorbate, succinate, benzenesulfonate, methanesulfonate, cyclohexanesulfamate and toluenesulfonate. The acid addition salts frequently provide a convenient means for isolating the product, e.g., by forming and precipitating the salt in an appropriate menstruum in which the salt is insoluble, then after separation of the salt, neutralizing with a base such as barium hydroxide or sodium hydroxide, to obtain the free base of formula I. Other salts may then be formed from the free base by reaction with an equivalent of acid.

The new compounds of this invention are central nervous system depressants and may be used as tranquilizers or ataractic agents for the relief of anxiety and tension states, for example, in mice, cats, rats, dogs and other mammalian species, in the same manner as chlordiazepoxide. For this purpose a compound or mixture of compounds of formula I or formula II or physiologically acceptable acid addition salt thereof may be administered orally or parenterally in a conventional dosage form such as tablet, capsule, injectable or the like. A single dose, or preferably two to four divided daily doses, provided on a basis of about 1 to 50 mg. per kilogram per day, preferably about 2 to 15 mg. per kilogram per day, is appropriate. These may be conventionally formulated in an oral or parenteral dosage form by compounding about 10 to 250 mg. per unit of dosage with conventional vehicle, excipient, binder, preservative, stabilizer, flavor or the like as called for by accepted pharmaceutical practice.

The new compounds also increase the intracellular concentration of adenosine-3',5'-cyclic monophosphate, and thus by the administration of about 1 to 100 mg./kg./day, preferably about 10 to 50 mg./kg., in single or two to four divided doses in conventional oral or parenteral dosage forms such as those described above may be used to alleviate the symptoms of asthma.

The following examples are illustrative of the invention and constitute preferred embodiments. Other members of the group may be produced by the use of the appropriately substituted 5-aminopyrazole and hydrazine in the place of those specifically shown in the examples by way of illustration. All temperatures are on the centigrade scale.

EXAMPLE 1

6-ethyl-1,6-dihydrodipyrazolo[3,4-*b*:3',4'-*d*]pyridin-3-one a. [(1-ethyl-5-pyrazolyl)aminomethylene]malonic acid diethyl ester 245 g. (2.2 mol.) of 1-ethyl-5-aminopyrazole and 476 g. (2.2 mol.) of ethoxymethylene malonic acid diethyl ester are heated to 120° (bath temperature) for 2 hours with stirring. The ethanol formed by this reaction is removed by means of a water aspirator. Then vacuum distillation (b.p. $_{0.1}$ 154°–160°) yields 520 g. (84 percent of theory) of a quickly crystallizing oil of [(1-ethyl-5-pyrazolyl)aminomethylene]malonic acid diethyl ester, m.p., 50°–53°.

b. 1-ethyl-4-hydroxy-1H-pyrazolo[3,4-*b*]pyridine-5-carboxylic acid ethyl ester 253 g. (0.9 mol.) of [(1-ethyl-5-pyrazolyl)aminomethylene] ether. The reaction mixture is heated to 235°–250° (bath temperature) and allowed to react at this temperature for 1–2 hours while the resulting ethanol is continuously distilled off. The last amount of alcohol is removed by means of a water aspirator. The diphenyl ether is separated by distillation with a fractionating column in vacuo. The 1-ethyl-4-hydroxy-1H-pyrazolo[3,4-*b*]pyridine-5-carboxylic acid ethyl ester is obtained at b.p. $_{0.05}$ 115°–120° (yield 195 g. = 92 percent of theory), m.p. 85°–87°.

c. 4-Ethoxy-1-ethyl-1H-pyrazolo[3,4-*b*]pyridine-5-carboxylic acid ethyl ester

To a solution of 259 g. (1.1 mol.) of 1-ethyl-4-hydroxy-1H-pyrazolo[3,4-*b*]pyridine-5-carboxylic acid ethyl ester in 1700 ml. of dimethylformamide, 400 g. of well pulverized potassium carbonate and 300 g. of ethyl iodide are introduced. The reaction mixture is stirred for 7 hours at 65° and filtered under suction, while hot, from excess potassium carbonate. Upon standing overnight, 165 g. of 4-ethoxy-1-ethyl-1H-pyrazolo[3,4-b]pyridine-5-carboxylic acid ethyl ester crystallize out of the solution, m.p. 112°–115°. After evaporation of the mother liquor, an additional 80 g. are obtained. The total yield amounts to 85 percent of theory.

d. 1-Ethyl-4-hydrazino-1H-pyrazolo[3,4-*b*]pyridine-5-carboxylic acid ethyl ester 316 g. of 4-ethoxy-1-ethyl-1H-pyrazolo[3,4-*b*]pyridine-5-carboxylic acid ethyl ester (1.2 mol.) are dissolved in 4.8 l. of absolute ethanol. Into this solution, 72 g. of hydrazine hydrate (100 percent) and 0.4 g. of zinc chloride are added. After refluxing for 4 hours, the hot solution is filtered, evaporated to dryness in vacuo and the white crystalline residue is crystallized from benzene-ligroin mixture (1:3). There are obtained 250 g. of 1-ethyl-4-hydrazino-1H-pyrazolo[3,4-*b*]pyridine-5-carboxylic acid ethyl ester, m.p., 139°–140°.

e. 6-Ethyl-1,6-dihydrodipyrazolo[3,4-*b*:3',4'-*d*]pyridin-3-one and hydrochloride To a solution consisting of 3 g. of sodium (0.13 mol.) in 150 ml. of absolute alcohol there are added 10 g. of 1-ethyl-4-hydrazino-1H-pyrazolo[3,4-*b*]pyridine-5-carboxylic acid ethyl ester (0.04 mol.). This mixture is refluxed for 6 hours. Subsequently, alcoholic hydrogen chloride is added to the solution in excess and after filtering off the precipitated sodium chloride, the filtrate is evaporated to dryness in vacuo. The residue, 6-ethyl-1,6-dihydrodipyrazolo[3,4-*b*:3',4'-*d*]pyridin-3-one hydrochloride weighing 8.5 g., is recrystallized from glacial acetic acid, m.p. 245°–246°. By neutralization of the foregoing hydrochloride with dilute sodium hydroxide, there is obtained 6-ethyl-1,6-dihydrodipyrazolo-[3,4-*b*:3' 4'-*d* ]pyridin-3-one, m.p. 276°–278°.

EXAMPLE 2

6-Benzyl-1,6-dihydrodipyrazolo[3,4-*b*:3',4'-*d*]pyridin-3-one a. By substituting an equivalent amount of 1-benzyl-5-aminopyrazole for the 1-ethyl-5-aminopyrazole in the procedure of example 1(a) and 1(b), 1-benzyl-4-hydroxy-1H-pyrazolo[3,4-b]-pyridine-5-carboxylic acid ethyl ester, m.p., 117°–119°, is obtained.

b. By treating the foregoing product at first with ethyl iodide and then with hydrazine hydrate (100 percent) according to the procedure of example 1(c) and 1(d), 1-benzyl-4-hydrazino-1H-pyrazolo[3,4-b]pyridine-5-carboxylic acid ethyl ester is obtained, m.p. 159°–161°.

c. Then 6-benzyl-1,6-dihydrodipyrazolo[3,4-b:3',4'-d]pyridine-3-one hydrochloride is prepared by refluxing the hydrazino compound according to the procedure of example 1(e), m.p. 258°–260° (absolute alcohol). The hydrochloride is neutralized as in example 1(e).

EXAMPLE 3

6-ethyl-1,6-dihydro-2-phenyldipyrazolo[3,4-b:3',4'-d]pyridine-3-one a. 4-chloro-1-ethyl-1H-pyrazolo[3,4-b]pyridine-5-carboxylic acid ethyl ester A mixture of 23.5 g. of 1-ethyl-4-hydroxy-1H-pyrazolo-[3,4-b]pyridine-5-carboxylic acid ethyl ester (0.1 mol.) and 150 ml. of phosphorous oxychloride is refluxed for 4 hours. The excess phosphorous oxychloride is removed by means of vacuum distillation. As soon as the phosphorous oxychloride has been removed, the oily residue solidifies on cooling. It is treated with water and filtered under suction (24.5 g.), m.p. 55°–60. The 4-chloro compound is recrystallized from N-hexane (22.5 g. = 87 percent), m.p. 62°.

b. 1-Ethyl-4-(phenylhydrazino)-1H-pyrazolo[3,4-b]pyridine-5-carboxylic acid ethyl ester To a solution of 7.5 g. of 4-chloro-1-ethyl-1H-pyrazolo-[3,4-b]pyridine-5-carboxylic acid ethyl ester (0.03 mol.) in 60 ml. of benzene are added 6.5 g. of phenylhydrazine (0.06 mol.). This mixture is kept at room temperature for 3 days. After this time, the separated phenylhydrazine hydrochloride is filtered under suction and the filtrate is evaporated to dryness in vacuo. The residue, 1-ethyl-4-(phenylhydrazino)-1H-pyrazolo[3,4-b]pyridine-5-carboxylic acid ethyl ester, is washed with water and ether and then recrystallized from alcohol, m.p. 176°–177°.

c. 6-Ethyl-1,6-dihydro-2-phenyldipyrazolo[3,4-b : 3',4'-d]pyridine-3-one

To a solution consisting of 0.35 g. sodium (0.015 mol.) in 25 ml. of absolute alcohol there are added 1.6 g. of 1-ethyl-4-(phenylhydrazino)-1H-pyrazolo[3,4-b]pyridine-5-carboxylic acid ethyl ester (0.005 mol.). The mixture is kept at room temperature overnight. The dark-brown colored solution is treated with an excess of alcoholic hydrogen chloride. After the addition of water 1.3 g. of 6-ethyl-1,6-dihydro-2-phenyl-dipyrazolo[3,4-b:3',4'd]-pyridin-3-one, precipitates, (m.p. 282°–284°). Recrystallization from dilute acetic acid provides a compound melting at 288°–289°

EXAMPLE 4

6-Ethyl-1,6-dihydro-1-methyldipyrazolo[3,4-b:3',4'-d]pyridin-3-one

By substituting an equivalent amount of methylhydrazine for the phenylhydrazine in the procedure of example 3, 6-ethyl-1,6-dihydro-1-methyldipyrazolo[3,4-b:3',4'-d]pyridin-3-one, m.p. 263°–264°, is obtained, yield 92 percent of theory.

EXAMPLE 5

The product of example 4 is also obtained by methylating the product of example 1(e), 6-ethyl-1,6-dihydrodipyrazolo[3,4-b:3',4'-d]pyridin-3-one, with dimethylsulfate in an aqueous sodium hydroxide solution, m.p. 263°–264°, yield 85–90 percent of theory.

EXAMPLE 6

6-Benzyl-1,6-dihydro-1-methyldipyrazolo[3,4-b:3',4'-d]pyridin-3-one

The methylation of 6-benzyl-1,6-dihydrodipyrazolo[3,4-b:3',4'-d]pyridine-3-one with dimethylsulfate according to the procedure of example 5 yields 6-benzyl-1,6-dihydro-1-methyl-dipyrazolo[3,4-b:3'4'-d]pyridin-3-one, m.p. 278°–280°.

EXAMPLE 7

6-Ethyl-1-(2-hydroxyethyl)-1,6-dihydrodipyrazolo[3,4-b:3',4'-d]pyridin-3-one

A mixture of 5 g. of 4-chloro-1-ethyl-1H-pyrazolo-[3,4-b]pyridine-5-carboxylic acid ethyl ester (0.02 mol.), 3 g. of 2-hydroxyethylhydrazine (0.04 mol.) and 50 ml. of benzene is kept at room temperature with stirring for 3 days. The precipitate (5.4 g.) is filtered under suction, washed with benzene and ether, then is recrystallized from absolute alcohol, m.p. 259°–261°.

EXAMPLES 8–25

By replacing the 1-ethyl-5-aminopyrazole in part (a) of example 1 with the appropriately $R_1$, $R_2$-substituted 5-aminopyrazole, the following additional compounds are obtained:

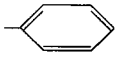

| Example | $R_1$ | $R_2$ |
|---|---|---|
| 8 | CH₃ | H |
| 9 | 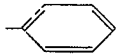 | H |
| 10 | C₂H₅ | CH₃ |
| 11 | C₂H₅ | C₂H₅ |
| 12 | —CH₂—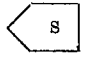 | CH₃ |
| 13 | —CH₂CH₂—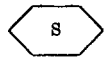 | H |
| 14 | 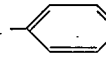 | CH₃ |
| 15 | CH₃ | CH₃ |
| 16 | 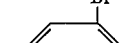 | H |
| 17 | 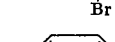 | C₂H₅ |
| 18 | 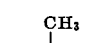—Cl | H |
| 19 | Br—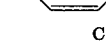—Br | H |
| 20 | —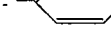—OCH₃ | CH₃ |
| 21 | CH₃—(with CH₃)—CH₃ | H |
| 22 | C₂H₅— | H |
| 23 | —CH₂— Cl, Cl | CH₃ |

7
Continued

| Example | R₁ | R₂ |
|---|---|---|
| 24 | −CH₂−⟨phenyl⟩−CH₃ | H |
| 25 | −CH₂−⟨phenyl with OCH₃, OCH₃⟩ | H |

By alkylating the product of each of examples 8 to 25 with dimethylsulfate as in example 5, a corresponding product with a methyl group in the 1-position (i.e., R₃ = methyl) is obtained in each case.

EXAMPLES 26–39

By replacing the 1-ethyl-5-aminopyrazole in part (*a*) of example 1 with a 5-aminopyrazole having the R₁ and R₂ substituents indicated in the table below and following the procedure of parts (*a*) and (*b*) of that example, the corresponding 1—R₁—3—R₂—4—hydroxy-1H-pyrazolo[3,4-*b*]pyridine-5-carboxylic acid ethyl ester is obtained. Then, substituting this compound for the starting material in example 3(*a*) and either utilizing phenylhydrazine as in part (*b*) or substituting an equivalent amount of a hydrazine having the appropriate substituent R₄ in the table below, the following additional compounds are obtained:

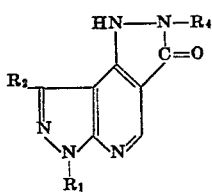

| Example | R₁ | R₂ | R₄ |
|---|---|---|---|
| 26 | CH₃ | H | ⟨phenyl⟩ |
| 27 | ⟨phenyl⟩ | H | ⟨phenyl⟩ |
| 28 | C₂H₅ | C₂H₅ | ⟨phenyl⟩ |
| 29 | −CH₂−⟨phenyl⟩ | CH₃ | ⟨phenyl⟩−Cl |
| 30 | −CH₂CH₂−⟨phenyl⟩ | H | ⟨phenyl⟩−Br |
| 31 | ⟨thiophene⟩ | H | ⟨phenyl⟩ |
| 32 | ⟨thiophene⟩ | C₂H₅ | ⟨phenyl⟩−Cl, Cl |
| 33 | ⟨phenyl⟩−Cl | H | ⟨phenyl⟩−Cl |
| 34 | ⟨phenyl⟩−Br, Br | H | ⟨phenyl⟩−Br, Br |
| 35 | ⟨phenyl⟩−OCH₃ | CH₃ | ⟨phenyl⟩−OCH₃ |
| 36 | ⟨phenyl⟩−CH₃ | H | ⟨phenyl⟩−CH₃ |
| 37 | −CH₂−⟨phenyl⟩−Cl, Cl | H | ⟨phenyl⟩−Cl, Cl |
| 38 | −CH₂−⟨phenyl⟩−CH₃ | H | ⟨phenyl⟩ |
| 39 | −CH₂−⟨phenyl⟩(CH₃)−OCH₃ | H | ⟨phenyl⟩ |

What is claimed is:

1. A compound of the formula

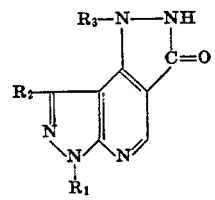

wherein $R_1$ is lower alkyl, cyclo-lower alkyl, $(R_5)_n$-phenyl or $(R_5)_n$-phenyl-lower alkyl, $R_2$ is hydrogen or lower alkyl, $R_3$ is hydrogen, lower alkyl or hydroxy-lower alkyl, $R_5$ is hydrogen, lower alkyl, halogen or lower alkoxy and $n$ is 1 or 2,
and acid physiologically acceptable addition salts thereof.

2. A compound of the formula

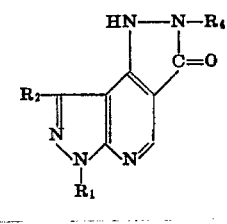

wherein $R_1$ and $R_2$ have the same meaning as in claim 1, $R_4$ is $(R_5)_n$-phenyl, and $R_5$ and $n$ have the same meaning as in claim 1,
and acid physiologically acceptable addition salts thereof.

3. A compound as in claim 1 wherein $R_1$ is lower alkyl and $R_2$ and $R_3$ each is hydrogen.

4. A compound as in claim 2 wherein the lower alkyl group is ethyl.

5. A compound as in claim 1 wherein $R_1$ and $R_3$ each is lower alkyl and $R_2$ is hydrogen.

6. A compound as in claim 1 wherein $R_1$ is ethyl, $R_2$ is hydrogen and $R_3$ is methyl.

7. A compound as in claim 1 wherein $R_1$ is lower alkyl, $R_2$ is hydrogen and $R_3$ is hydroxy-lower alkyl.

8. A compound as in claim 7 wherein the lower alkyl group is ethyl and the hydroxy-lower alkyl group is hydroxyethyl.

9. A compound as in claim 1 wherein $R_1$ is phenyl-lower alkyl, $R_2$ and $R_3$ each is hydrogen.

10. A compound as in claim 9 wherein the phenyl-lower alkyl group is benzyl.

11. A compound as in claim 2 wherein $R_1$ is lower alkyl, $R_2$ is hydrogen and $R_4$ is phenyl.

12. A compound as in claim 11 wherein the lower alkyl group is ethyl.

* * * * *